United States Patent Office 3,613,375
Patented Oct. 19, 1971

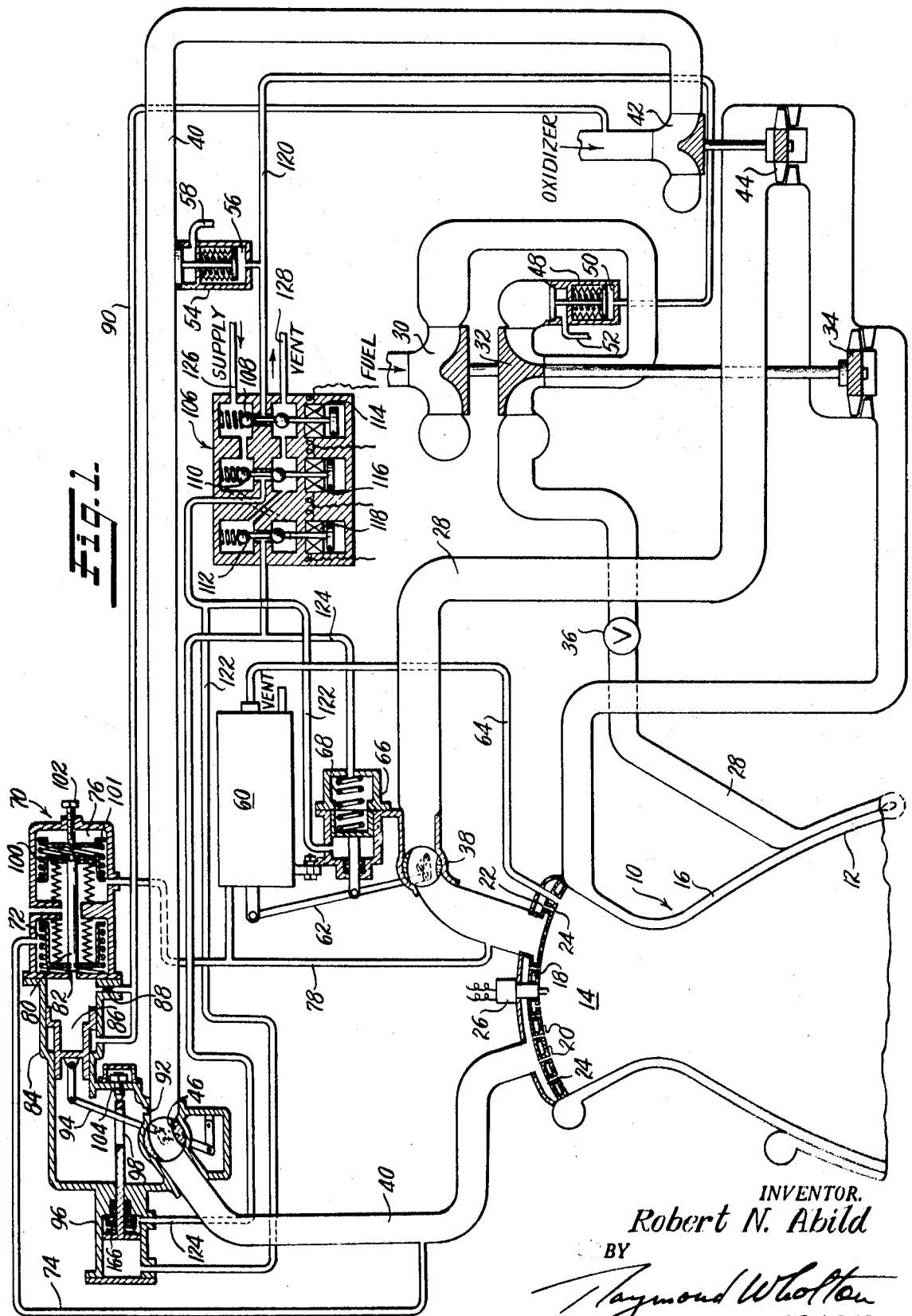

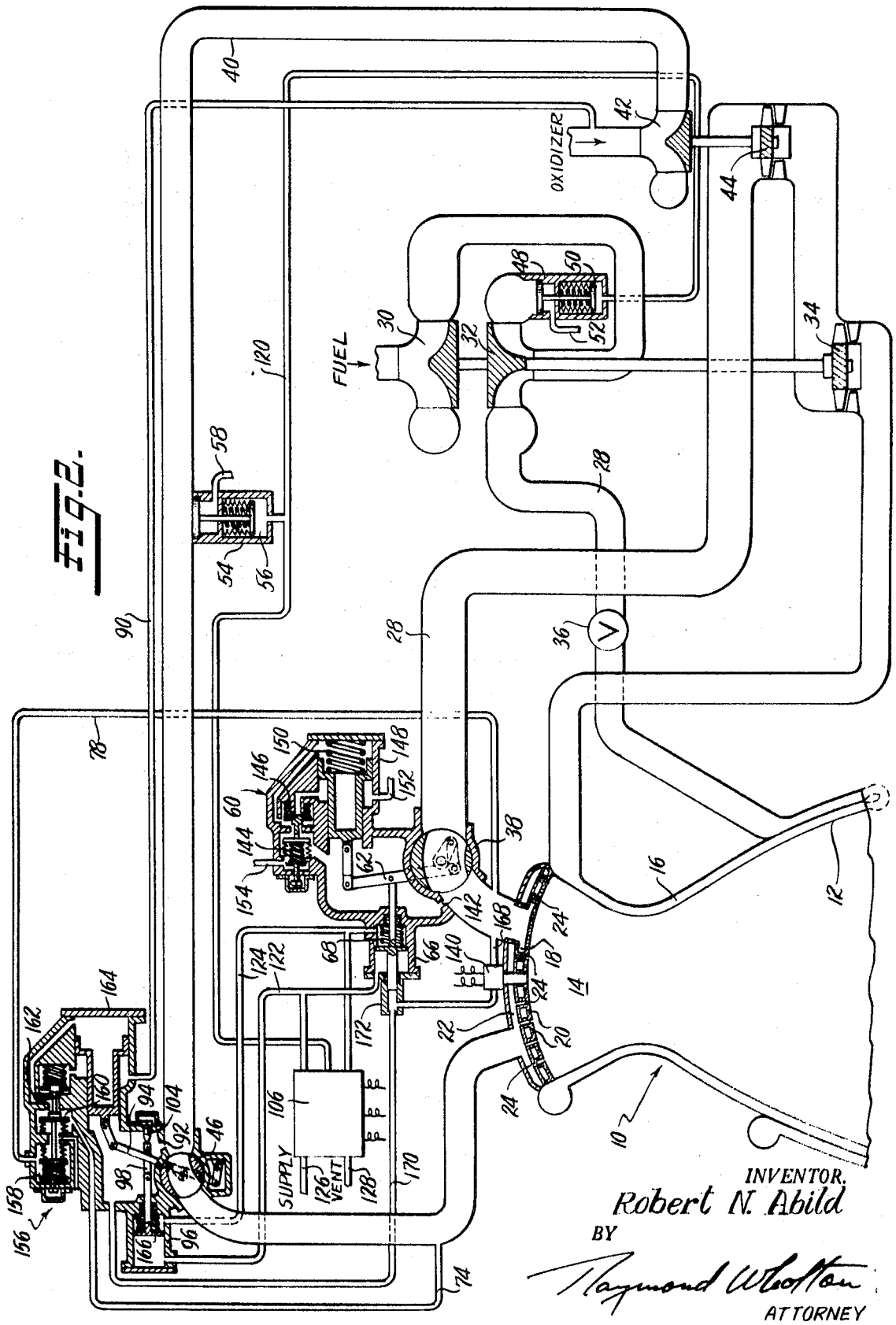

3,613,375
ROCKET ENGINE PROPELLANT FEEDING AND CONTROL SYSTEM
Robert N. Abild, New Britain, Conn., assignor to United Aircraft Corporation, East Hartford, Conn.
Filed June 5, 1961, Ser. No. 114,791
Int. Cl. F02k 3/00
U.S. Cl. 60—240                                                                    14 Claims This invention relates to a novel rocket engine propellant feeding and control system, and more specifically to a system employing separate turbines, disposed in series relation, and driven by vaporized propellant, providing the source of power to drive the fuel and oxidizer pumps, in which the fuel and oxidizer supplies are automatically regulated to maintain a scheduled flow and a predetermined ratio.

Heretofore the fuel and oxidizer pumps for rocket engines have been driven by a single turbine operated by vaporized fuel or oxidizer. This has posed serious design problems, involving gearing design and the weight of gearing between the fuel and oxidizer pump shafts.

It is an object of the invention to provide a novel propellant feeding and control system for a bipropellant rocket engine which eliminates the above gear design problems encountered by the use of a single driving turbine.

It is a further object to provide a novel propellant feeding and control system for a bipropellant rocket engine which effects a reduction in weight.

It is a still further object to provide a novel propellant feeding and control system for a bipropellant rocket engine which permits quick starts and self-sustaining operation.

It is a still further object to provide a novel propellant feeding and control system for a bipropellant rocket engine in which a predetermined scheduled flow of propellants and scheduled ratio of propellants are automatically maintained.

The above and other objects and advantages will be apparent from a consideration of the following description in conjunction with the accompanying drawings, in which:

FIG. 1 is a diagrammatic representation of a first embodiment in which the control is effected as a function of combustion chamber pressure; and FIG. 2 is a diagrammatic representation of a second embodiment in which the control is effected as a function of the fuel delivery pressure.

Referring to the drawings, and to the embodiment shown in FIG. 1, the numeral 10 designates a conventional liquid bipropellant type of rocket engine having a nozzle 12 and a combustion chamber 14. A cooling jacket 16 surrounds the combustion chamber 14 and nozzle 12, through whch liquid fuel is fed and vaporized to cool the rocket engine, as is well known in the art. The head of the combustion chamber 14 includes a fuel manifold 18 having a series of injectors 20 delivering fuel into the combustion chamber, and an oxidizer manifold 22 having a series of injectors 24 delivering oxidizer into the combustion chamber. A spark igniter 26 is provided to initiate combustion.

A fuel supply line 28, leading from a source of liquid fuel, is connected with the fuel manifold 18. The supply line 28 includes the jacket 16, so that fuel, in passing through the supply line, traverses the cooling jacket from the nozzle end toward the combustion chamber end to provide the coolant for the rocket engine and to vaporize the fuel to form a gaseous motive fluid to supply the power to operate the pumps, as will be seen later. The fuel supply line includes a first stage pump 30 and a second stage pump 32, disposed in series relation, through which fuel passes before reaching the cooling jacket 16, and being driven by a single turbine 34 in the fuel supply line between the cooling jacket 16 and the fuel manifold 18. The supply line 28 also includes a trap valve 36 between the pumps and the cooling jacket 16, and a flow control valve 38 between the turbine 34 and the fuel manifold 18, the latter valve being disposed adjacent the manifold as shown.

Oxidizer is supplied by an oxidizer supply line 40 connected with a source of liquid oxidizer and supplying the oxidizer manifold 22. The supply line 40 includes a pump 42 driven by a turbine 44 disposed in the fuel supply line 28 downstream of the turbine 34. The supply line 40 also includes a flow control valve 46 adjacent the oxidizer manifold 22.

A dump valve 48 is disposed on the discharge end of the second stage pump 32, and includes a spring to normally hold it closed. A pressure chamber 50 is adapted to receive pressure fluid to open the dump valve, as will be described more fully hereinafter. A drain 52 allows the escape of fuel from the supply line 28 to the atmosphere when the dump valve is opened. The oxidizer supply line also includes a dump valve 54 between the pump 42 and control valve 46 to permit the waste of liquid oxidizer from the supply line to the atmosphere by way of a drain 58 when the valve is opened by admission of pressure fluid to a pressure chamber 56. A spring normally holds the dump valve closed.

The flow control valve 38 is regulated by an operating means 60 comprising a well known type of pressure responsive servomotor producing a movement of the servometer as a function of the pressure within the combustion chamber 14. Movement of the servomotor causes corresponding movement of the flow control valve 38 by a lever 62 connected at one end to the piston rod of the servomotor and at its other end to an operating lever on the flow control valve. A pressure sensing duct 64 interconnecting the combustion chamber 14 and a pressure sensing means in the operating means 60 results in a movement of the flow control valve 38 as a function of the combustion chamber pressure to maintain a predetermined constant pressure within the combustion chamber and a corresponding constant thrust in the reaction nozzle 12. An auxiliary operating means 66, comprising a double acting servomotor, is connected with the operating lever 62 intermediate its ends to produce independent opening and closing of the flow control valve 38 at starting and stopping of the engine as more fully disclosed later. The auxiliary operating means 66 includes a spring 68 normally urging the flow control valve 38 towards its closed position.

The oxidizer flow control valve 46 is regulated by an operating means 70 comprising a pressure ratio maintaining device to maintain a predetermined oxidizer/fuel ratio in the combustion chamber. The operating means 70 comprises a pair of opposed bellows, one operating within a first pressure chamber 72 having connection by a pressure duct 74 with the oxidizer supply line 40 downstream of the flow control valve 46, whereby one of the bellows senses the delivery pressure of the oxidizer. The other bellows is disposed within a second pressure chamber 76 having a pressure connection by a duct 78 with the fuel supply line 28 downstream of the flow control valve 38, whereby the other bellows is subject to the fuel delivery pressure downstream of the flow control valve 38. The areas of the two opposed bellows are equal, and the movement of a pilot valve 80 attached thereto is a function of the pressure ratio in the supply lines 28 and 40. Movement of the pilot valve 80 regulates the rate of flow of oxidizer from the pressure chamber 72 through an opening 82 into a working chamber 86 of a servomotor 84, tending to move the piston thereof toward the left. Fluid from the working chamber 86 is permitted to escape at a controlled rate through a restricted outlet 88 and by drain 90 to the oxidizer supply line 40 upstream of the pump 42. The oxidizer supply line 40, immediately upstream of the flow control valve 46, is provided with an opening 92 through which oxidizer flows to a pressure chamber on the left hand side of the piston of the servomotor 84 to urge the piston toward the right.

The piston of the servomotor 84 is connected with the flow control valve 46 by a lever 94, the parts being so connected that movement of the piston toward the left effects closing of the flow control valve, and movement toward the right causing opening thereof.

The flow control valve 46 is also under the control of an auxiliary operating means 96 comprising a double acting servomotor including a slotted guide 98 so constructed that the ends of the slot cooperate with the lever 94 to control movement of the latter and the flow control valve 46 connected therewith. A spring 166 normally holds the piston of the servomotor in the position to maintain the flow control valve 46 in the closed position. An adjustable stop 104 limits the movement of the slotted guide 98 toward the right.

The pressure ratio maintaining means 70 includes an adjustable spring 100 between the bellows in the pressure chamber 76 and an abutment 101 adjusted by a screw 102 to vary the force of the spring and thereby the pressure ratio or the oxidizer/fuel ratio to be maintained in the system.

A starting control means 106 controls the position of the dump valves 48 and 54 and the flow control valves 38 and 46 to permit a pre-cooling of the pumps 30, 32 and 42 prior to starting to prevent the vaporization of the propellants therein starting with the resultant vapor lock. The control means 106 comprises a first pilot valve 108, a second pilot valve 110, and a third pilot valve 112, said pilot valves being under the control, respectively, of a first solenoid 114, a second solenoid 116, and a third solenoid 118. Springs normally urge the pilot valves in the downward direction. The solenoids may be simultaneously or selectively actuated, as desired.

The first pilot valve 108 controls the flow of pressure fluid through a pressure connection 120 leading to the pressure chambers 50 and 56 of the dump valves 48 and 54, respectively. The second pilot valve 110 controls the flow of pressure fluid through a pressure connection 122 leading to the left hand ends of the servomotors of the auxiliary flow control valve operating means 66 and 96, and the third pilot valve 112 controls the flow of pressure fluid through a pressure connection 124 with the right hand ends of the servomotors of said auxiliary flow control valve operating means. The pilot valves 108, 110 and 112 receive pressure fluid from a supply connection 126 and discharge through a vent 128.

In shut down condition, the trap valve 36 is maintained closed, and any fuel between the trap valve and the closed fuel flow control valve 38 is in a vaporized state, so that, immediately on starting, this vaporized fuel is available to operate the turbines 34 and 44. Also, the walls of the supply line 28 downstream of the trap valve 36 are warmed by the ambient atmosphere, so that the liquid cryogenic fuel which flows when the trap valve 36 is opened on starting will be immediately vaporized to facilitate starting.

Auxiliary means, not shown, are provided to supply liquid cryogenic fuel and oxidizer under low pressure to the supply lines 28 and 40. In starting, solenoid 114 of the starting control is first energized. Upward movement of the pilot valve 108 admits pressure fluid to the pressure connection 120 and pressure chambers 50 and 56 of the dump valves 48 and 54, respectively, to open the valves and permit the liquid fuel and liquid oxidizer downstream of the pumps 32 and 42 to discharge to waste by the drains 52 and 58 to pre-cool the pumps. After a brief interval the solenoid 114 is de-energized, permitting the spring to return valve 108 to the position shown, which results in the closing of dump valves 48 and 50. Simultaneously, trap valve 36 is opened and solenoids 116 and 118 of the starting control 106 are energized. Upward movement of the pilot valve 112 connects pressure conduit 124 to the vent 128, and upward movement of the pilot valve 110 supplies pressure fluid to the pressure connection 122, which moves the pistons in the servomotors in the auxiliary operating means 66 and 96 toward the right to open the flow control valves 38 and 46 to intermediate positions independently of the operating means 60 and 70, respectively. The pivot connection between the piston rod in the auxiliary operating means 66 and the lever 62 permits this point to act as a fulcrum for movement of lever 62 as influenced by operating means 60 to result in positioning flow control valve 38. The slotted guide 98 on the piston rod of the auxiliary operating means 96 now permits free movement of the lever 94 as influenced by operating means 70 to position the flow control valve 46. Pressure quickly builds up in the supply lines 28 and 40 such that even before design pressure levels are attained it acts as the servo supply fluids for the operating means 60 and 70 to position the flow control valves 38 and 46, respectively. Since the pressure within combustion chamber 14 is below the design level as sensed through conduit 64 by operating means 60, its servomotor will open the fuel flow control valve 38 to its most open position, resulting in fuel entering the combustion chamber slightly in advance of the oxidizer. During this starting interval the pressure ratio maintaining device of operating means 70 continually senses, through conduits 78 and 74, the delivery pressures of fuel and oxidizer and positions the oxidizer flow control valve 46 to maintain the oxidizer/fuel ratio close to the design value. The igniter is energized to initiate combustion within the combustion chamber 14 and the heat soon vaporizes the fuel traversing the cooling jacket 16, which vapor forms the motive fluid for the turbines 34 and 44 driving the fuel and oxidizer pumps, respectively, bringing the system quickly to a state of self sustaining operation. The vaporized fuel passes through the turbines 34 and 44 in series, and the parts are so designed, in view of the pressures across the turbines, that the pumps are operated at the desired speed to give the desired feeding pressure.

The pressure within the combustion chamber 14 acts through the pressure duct 64 on the pressure sensing means within the operating means 60 in a well known manner to maintain the flow control valve 38 in a position to maintain the desired operating pressure. The pressure ratio operating means 70 senses the ratio of pressures within the supply lines 28 and 40, by way of the pressure ducts 74 and 78 downstream of the flow control valves, to position the oxidizer flow control valve 46 to maintain a predetermined oxidizer/fuel ratio. An increase in fuel delivery pressure produces a movement of the pilot valve 80 toward the left to throttle the flow of oxidizer through the opening 82 to the pressure chamber 86, resulting in a movement of the piston therein toward the right and a corresponding opening movement of the flow control valve 46 to increase the flow of oxidizer. In a like manner, a decrease in fuel delivery pressure produces a corresponding movement of the flow control valve 46 toward its closing position.

While, in the above embodiment and in the embodiment described below, the operating means 60 controls the fuel flow control valve 38 and the operating means 70 operates the oxidizer flow control valve 46, it is evident that the operating means may be reversed so that the operating means 60 regulates the oxidizer flow control valve 46 and the operating means 70 regulates the fuel control valve 38. It is also evident that the cooling jacket 16 and the turbines 34 and 44 may be disposed in the oxidizer supply line, and that the flow of motive fluid through the turbines 34 and 44 may be reversed, that is to say, the turbine 44 may be disposed upstream of the turbine 34 within the scope of this invention.

FIG. 2 illustrates an embodiment in which the operating means 60 senses the fuel feeding pressure downstream of the flow control valve 38 instead of the combustion chamber pressure, and in which a different form of igniter is employed for the rocket engine, and in which a different form of operating means regulates the position of the flow control valve for the oxidizer.

Corresponding elements in FIG. 2 are designated by the same reference numerals as in FIG. 1.

The combustion chamber 14 includes an igniter 140 in which fuel and oxidizer are burned and a flame is projected into the combustion chamber to initiate and maintain combustion in a well known manner.

A pressure tap 142 in the fuel supply line downstream of the flow control valve 38 admits fuel under pressure to a pressure chamber housing a bellows 144 in the operating means 60, which bellows senses the fuel delivery pressure to operate a double acting pilot valve 146 regulating the flow of fuel under pressure to the piston of the servomotor 148. A spring 150 urges the piston toward the left, aided by the pressure in the chamber on the piston's right side, while fuel under pressure, acting on the left hand side of the piston, urges the piston toward the right. The servomotor also includes a drain 152 from the annular chamber at the middle of the piston, and a vent 154 which exposes the unpressurized side of the bellows 144 to the pressure of the surrounding atmosphere as a reference pressure.

The oxidizer flow control valve 46 is operated by an operating means 156 which regulates the position of the valve 46 to maintain a predetermined oxidizer/fuel pressure ratio. The operating means 156 includes a pair of opposed bellows, one within a first pressure chamber 158 and another within a second pressure chamber 160, the pressure chambers being connected with the pressure ducts 78 and 74 to sense the delivery pressures of the fuel and oxidizer, respectively. The bellows are connected to operate a double acting pilot valve 162 to control the position of a servomotor 164 operatively connected with the flow control valve 46 by an operating lever 94.

Fuel is supplied to the igniter 140 by a conduit 168 connected with the fuel supply line 28 downstream of the flow control valve 38, and oxidizer is supplied by a conduit 170, including a valve 172, connected with the oxidizer supply line 40 by way of the opening 92 upstream of the flow control valve 46. The movable member of the valve 172 is connected with the piston in the auxiliary operating means 66 so that movement of the auxiliary operating means to close the fuel flow control valve 38 simultaneously closes the valve 172 to discontinue the supply of oxidizer to the igniter, and vice versa. In this embodiment, the igniter continues in operation while the rocket engine is fed with propellants. In the first embodiment, the igniter may also be continued in operation, or may be de-energized after combustion is initiated in the combustion chamber.

In the operation of this embodiment, as in the case of the first embodiment, the sequential selective energization of the valve solenoids of the starting control 106 effects the opening of the dump valves 48 and 54 to precool the propellant pumps, followed by closing of the dump valves 48 and 54 and actuation of the auxiliary operating means 66 and 96 to open the flow control valves 38 and 46 to an intermediate position, independently of the control effected by the operating means 60 and 156, after which propellant pressures rise in propellant supply lines 28 and 40 and the operating means 60 and 156 take over control in the manner of the first embodiment.

In this embodiment, as in the first embodiment, operating means 60 functions to maintain a predetermined constant pressure within the combustion chamber 14 and a corresponding constant thrust in the reaction nozzle 12. In this embodiment, however, the fuel delivery pressure is used as being a function of the combustion chamber pressure. This is valid because the fuel delivery pressure is the sum of the chamber pressure and the pressure drop of the fuel in flowing through the injectors 20, and only when both pressure components are near to the desired values will the fuel delivery pressure also be at the desired value. In this embodiment, the bellows 144 senses the fuel delivery pressure and operates the flow control valve 38 to maintain a constant delivery pressure to the combustion chamber 14 to assure a constant thrust of the rocket engine. Should the delivery pressure increase above the desired value, the pilot valve 146 is moved to the left, thereby restricting the flow of fuel from the opening 142 to the right hand side of the piston in the servomotor 148 and draining a part of the fluid on the right hand side through the drain 152 to waste. The pressure of the fuel acting on the left hand side of the piston urges it toward the right against the compression of spring 150 and the reduced pressure on the right hand side to move the flow control valve 38 toward a closing position which decreases the feed of fuel to the combustion chamber. Upon a decrease of delivery pressure below the desired value, the spring within the bellows 144 urges the pilot valve toward the right to admit more pressure fluid to the right hand side of the piston in the servomotor 148 to move the piston toward the left and to move the flow control valve 38 toward its opening position to increase the delivery of fuel to the combustion chamber.

In this embodiment, and similarly in the first embodiment, the operating means 156 regulates the position of the oxidizer flow control valve 46 to maintain a predetermined oxidizer/fuel pressure ratio. An increase in fuel pressure downstream of the flow control valve 38 is effective through the pressure duct 78 to move the pilot valve 162 toward the right to restrict the flow of oxidizer from the pressure duct 74 to the piston of the servomotor 164, and to permit the escape of pressure fluid from the right hand side of the piston of the servomotor 164 through the waste or drain 90 to the inlet of the oxidizer pump 42, permitting the pressure of the oxidizer on the left hand side of the piston to move the latter toward the right to move the flow control valve 46 to an opening position to effect a corresponding increase in the flow of oxidizer. Similarly, a decrease in fuel pressure in the pressure duct 78 results in a corresponding closing of the oxidizer flow control valve 46 to feed a decreased quantity of oxidizer. Variations in the delivery pressure of oxidizer as sensed through the duct 74 have a corresponding effect on operating means 156. An increase in oxidizer delivery pressure acts on the bellows in the chamber 160 to move it and the pilot valve 162 toward the left, whereby oxidizer flows to the right hand side of the piston of the servomotor 164 to move said piston toward the left, and to effect a closing movement of the flow control valve 46 and a corresponding decrease in the oxidizer delivery pressure. Similarly, a decrease in oxidizer delivery pressure downstream of the flow control valve 46 is effective on the bellows in the chamber 160 to permit the spring in chamber 158 to move the pilot valve 162 toward the right to restrict the flow of oxidizer to the servomotor 164 and to bleed a part of the pressure fluid from the right hand side of the piston in the servomotor 164 into the drain 90, whereby the fluid pressure on the left hand side of said piston predominates to move the piston toward the right and to effect a further opening of the flow control valve 46 and a corresponding increase in the oxidizer delivery pressure.

In the operation of the second embodiment, as similarly in the first embodiment, the engine is shut down by deenergizing all solenoids in the start control 106. This effects the closing of both flow control valves 38 and 46 through operation of the auxiliary operating means 66 and 96. Simultaneously flow of fuel to the igniter is terminated by closure of the flow control valve 38, preventing further fuel from reaching duct 168, and flow of oxidizer to the igniter is terminated by valve 172 being operated to its closed position by the operation of the auxiliary operating means 66.

Having fully described my invention, it is to be understood that I do not wish to be limited to the details and arrangements set forth herein but that various changes may be made without departing from the principle of the invention or from the scope of the annexed claims.

I claim:

1. A propellant feeding and control system for a rocket engine having a combustion chamber and a reaction nozzle surrounded by a vaporizing jacket, and fuel and oxidizer injectors to supply propellants to the combustion chamber, comprising: a first propellant supply line including a first pump means connected with said fuel injector; a second propellant supply line including a second pump means connected with said oxidizer injector; one of said propellant supply lines including said vaporizing jacket; turbine means drivingly connected with said first and said second pump means, and being disposed in said propellant supply line which includes the vaporizing jacket, between said vaporizing jacket and the injector, in said propellant supply line, whereby said turbine means and said pump means are driven by vaporized propellant; at least the pump means connected with said vaporizing jacket supplying a cryogenic propellant; a first control valve movable to a propellant flow cut-off position in said first supply line adjacent said fuel injector; a second control valve movable to a propellant flow cut-off position in said second supply line adjacent said oxidizer injector; and a trap valve, movable to a propellant flow cut-off position, in said propellant supply line including the vaporizing jacket, said trap valve and said control valves being disposed downstream from the pump means in their respective supply lines, and the vaporizing jacket and turbine means being disposed between the trap valve and a control valve, whereby cryogenic propellant in said supply line between said trap valve and said control valve therein, when said valves are closed, is in a vaporized state.

2. A propellant feeding and control system for a rocket engine having a combustion chamber and a reaction nozzle surrounded by a vaporizing jacket, and fuel and oxidizer injectors to supply propellants to the combustion chamber, comprising: a first propellant supply line including first pump means connected with said fuel injector; a second propellant supply line including second pump means connected with said oxidizer injector; one of said supply lines including said vaporizing jacket; turbine means drivingly connected with said first and said second pump means and disposed in said supply line which includes the vaporizing jacket, between said vaporizing jacket and the injector in said line, whereby said turbine means and said pump means are driven by vaporized propellant, including a first flow control valve in said first supply line, a second flow control valve in said second supply line, means responsive to a condition which varies with the reaction thrust operating one of said flow control valves to maintain scheduled thrust, and means, responsive to the differential propellant pressure in said first and said second supply lines downstream from the control valves therein, maintaining a predetermined oxidizer/fuel ratio operating the other of said flow control valves.

3. A propellant feeding and control system as defined in claim 2, in which said means responsive to a condition which varies as the reaction thrust operates said first flow control valve, and in which said means maintaining a predetermined oxidizer/fuel ratio operates said second flow control valve.

4. A propellant feeding and control system as defined in claim 2, in which said means responsive to a condition which varies as the reaction thrust includes means sensing combustion chamber pressure.

5. A propellant feeding and control system as defined in claim 2, in which said means responsive to a condition which varies as the reaction thrust includes means sensing the delivery pressure of one of said propellants to the injector.

6. A propellant feeding and control system as defined in claim 2, in which said means responsive to a condition which varies as the reaction thrust includes means sensing the delivery pressure of the fuel to the injector.

7. A propellant feeding and control system as defined in claim 2, in which said first and said second pump means feed cryogenic propellants through the respective supply lines, including dump valves at the discharge ends of said first and second pump means, a first auxiliary operating means connected with said first flow control valve, a second auxiliary operating means connected with said second flow control valve, operating means connected with said dump valves to effect opening and closing thereof, and starting means effective to open said dump valves while holding closed said first and said second auxiliary operating means, and vice versa.

8. A propellant control system for a bi-propellant rocket engine having a combustion chamber and a reaction nozzle, and fuel and oxidizer injectors to supply propellants to the combustion chamber, comprising: a first supply line connected with said fuel injector; a second supply line connected with said oxidizer injector; means to supply fuel and oxidizer under low pressure to said supply lines; a first flow control valve in said first supply line; a second flow control valve in said second supply line; means, responsive to a condition which varies with the reaction thrust, operatively connected with one of said flow control valves; means, responsive to the pressure ratio of the propellants fed to the respective injectors, connected with the other of said flow control valves to maintain a predetermined oxidizer/fuel ratio; and auxiliary operating means connected with said flow control valves and operable to open and close said flow control valves independently of said means responsive to a condition which varies as the reaction thrust and said oxidizer/fuel ratio maintaining means.

9. A propellant control system as defined in claim 8, in which said means responsive to a condition which varies as the reaction thrust includes means sensing combustion chamber pressure.

10. A propellant control system as defined in claim 8, in which said means responsive to a condition which varies as the reaction thrust includes means sensing the delivery pressure of one of said propellants.

11. A propellant control system as defined in claim 8, in which said means maintaining a predetermined oxidizer/fuel ratio includes a servomotor, a pilot valve operated as a function of the pressure ratio to control pressure fluid to the servomotor to effect movement of the flow control valve, and a pressure tap, upstream of the flow control valve which is operated by said ratio maintaining means, supplying pressure fluid to said servomotor to effect flow control valve movement.

12. A propellant control system as defined in claim 8, in which said means maintaining a predetermined oxidizer/ fuel ratio includes a servomotor, a pilot valve operated as a function of the pressure ratio to control pressure fluid to the servomotor to effect movement of the flow control valve, and a pressure tap, downstream of the flow control valve which is operated by the ratio maintaining means, supplying pressure fluid to said servomotor to effect flow control valve movement.

13. A propellant control system as defined in claim 8, including an igniter in said combustion chamber, a first conduit interconnecting said igniter and one of said supply lines downstream of the flow control valve therein, a second conduit interconnecting said igniter and the other of said supply lines upstream of the flow control valve therein, and a valve in said second conduit connected with one of said auxiliary operating means to close said second conduit when said auxiliary operating means closes its associated flow control valve.

14. A propellant control system as defined in claim 8, including an igniter in said combustion chamber, a first conduit interconnecting said igniter and the fuel supply line downstream of the flow control valve therein, a second conduit interconnecting said igniter and the oxidizer supply line upstream of the flow control valve therein, and a valve in said second conduit connected with one of said auxiliary operating means to close said second conduit when said auxiliary operating means closes its associated flow control valve.

References Cited

UNITED STATES PATENTS

| | | | |
|---|---|---|---|
| 2,631,426 | 3/1917 | Jewett | 60—39.27 |
| 2,708,342 | 5/1955 | Allen | 60—35.6 R2 |
| 2,816,417 | 12/1957 | Bloomberg | 60—35.6 R2 |

FOREIGN PATENTS

| | | | |
|---|---|---|---|
| 853,495 | 11/1960 | Great Britain | 60—35.6 R |

SAMUEL FEINBERG, Primary Examiner

U.S. Cl. X.R.

60—39.14, 39.27, 39.28, 39.48, 243, 250, 267